INVENTORS
RICHARD W. GEBS
BALDWIN W. RIDLEY
BY George Sipkin
Lee J. Huntzberger
ATTORNEYS

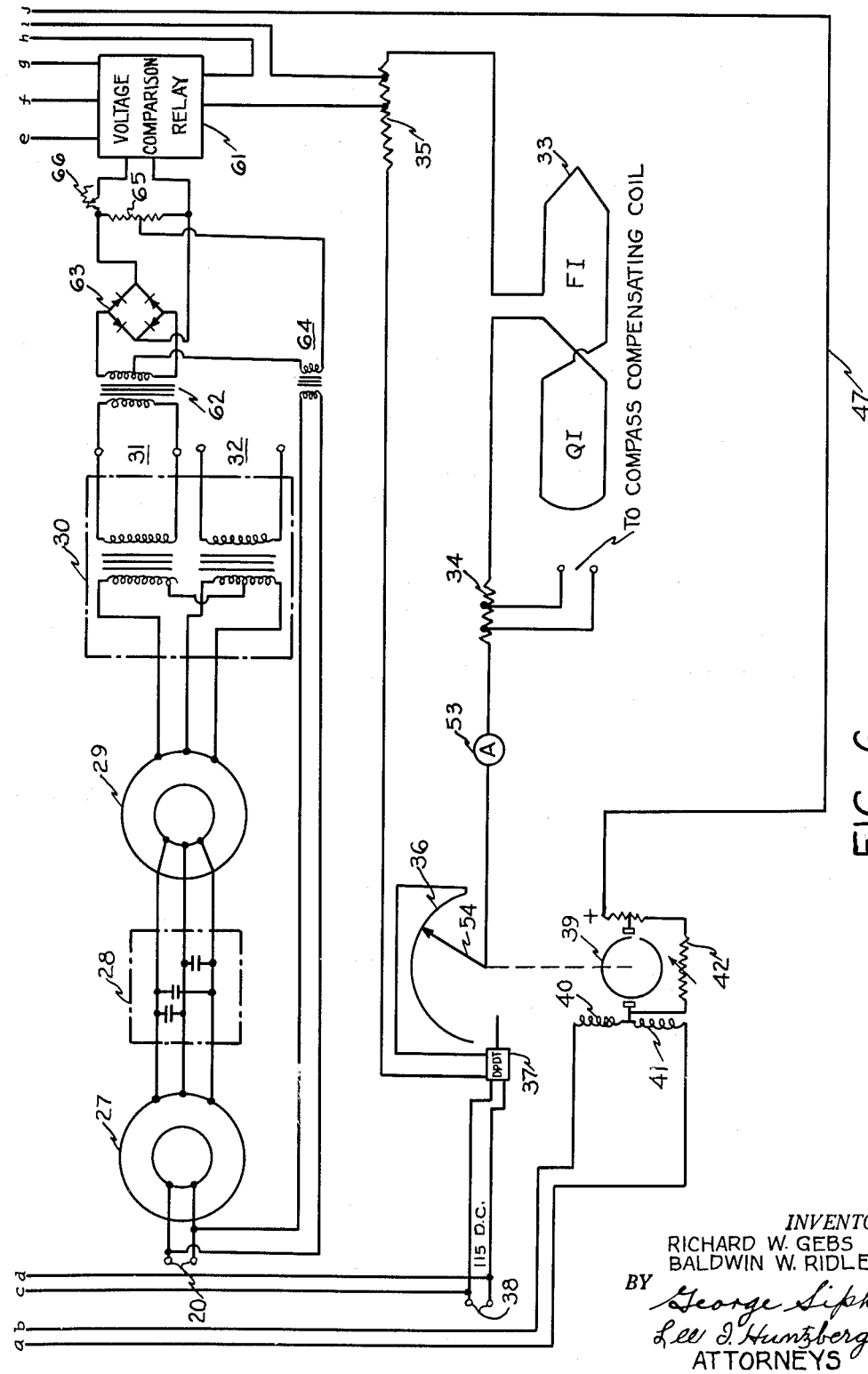

Jan. 10, 1956   R. W. GEBS ET AL   2,730,063
DEGAUSSING SYSTEM
Filed Nov. 10, 1952   4 Sheets-Sheet 4
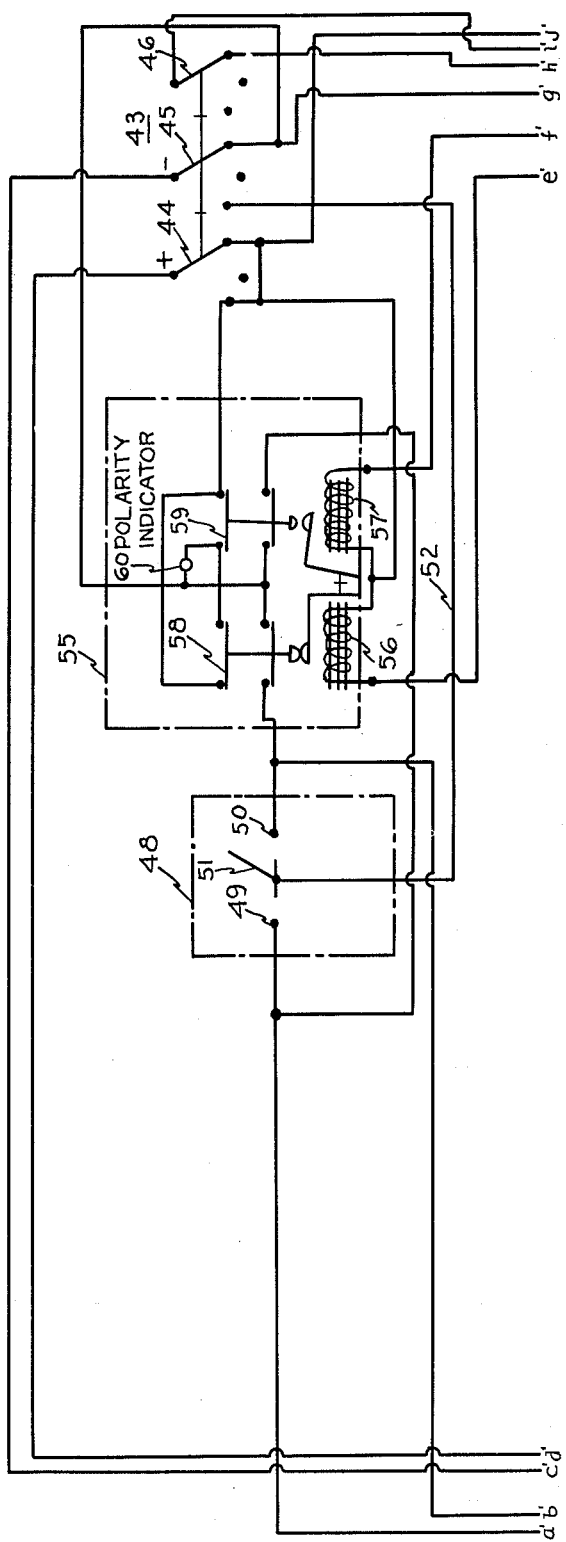
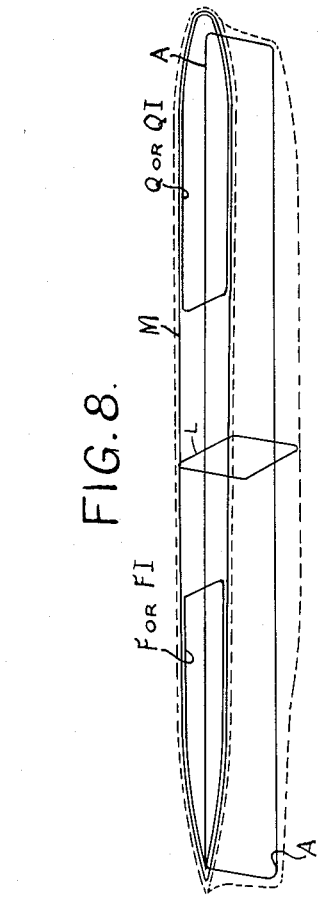
INVENTORS
RICHARD W. GEBS
BALDWIN W. RIDLEY
BY George Sipkin
Lee D. Hunzberger
ATTORNEYS

United States Patent Office 2,730,063
Patented Jan. 10, 1956

2,730,063

DEGAUSSING SYSTEM

Richard W. Gebs, New York, and Baldwin W. Ridley, Valley Stream, N. Y.

Application November 10, 1952, Serial No. 319,802

8 Claims. (Cl. 114—240)

(Granted under Title 35, U. S. Code (1952), sec. 266)

The invention described herein may be manufactured and used by or for the Government of the United States of America for governmental purposes without the payment of any royalties thereon or therefor.

The invention described herein is related to the invention described in the copending application of Richard W. Gebs and Baldwin W. Ridley, Serial Number 319,801, filed November 10, 1952, now U. S. Patent No. 2,718,205 and entitled Degaussing System.

This invention relates to magnetic systems and more particularly to systems for producing magnetic fields of such magnitude and direction that they nullify particular existing magnetic fields.

Since the advent of magnetically operated explosives such as magnetic mines and magnetic torpedoes, considerable research has been directed toward the development of countermeasures for use against these weapons.

Magnetic mines and torpedoes are generally designed to detonate when the earth's magnetic field is locally disturbed or distorted due to the proximity of a vessel. The said field distortion is caused by the fact that the vessel has in it produced its own magnetic field and superimposes this field on the earth's field. The field of the vessel may have any angle with respect to the horizontal axis of the vessel and any magnitude but for convenience the field of the vessel may be divided into an induced magnetic component, and a permanent magnetic component. The vessel's induced magnetic component is caused by the vessel's becoming a magnet in the presence of the earth's field. The induced magnetization of the vessel occurs along the line of the earth's field. The vessel's permanent magnetic component is caused by the vessel's being magnetized at some previous time due to mechanical working of the steel in the earth's field or by electromagnetic agitation. The permanent magnetic component of the vessel remains substantially constant for short periods of time and is independent of immediate field conditions and heading whereas the induced magnetic component varies as a function of the vessel's latitude and heading.

Since the purpose of degaussing is to minimize or nullify the disturbance or distortion of the earth's magnetic field, it is first necessary to determine the magnetic field of the vessel. This is accomplished by obtaining plots of the vessel's magnetism as the latter passes over a magnetic range. From these plots the degaussing needs of the vessel may be readily determined. To overcome the distortion of the earth's field caused by superimposing the components of the vessel's field thereon, coils of cable are wound about the vessel and are called degaussing coils or degaussing belts, the word coils being used in this description. The coils are energized from a D. C. source and produce magnetic field components equal and opposite to the components of the vessel's field. Each coil is composed of a main loop and may in addition have smaller loops in the area covered by the main loop and usually at the same level. These smaller loops oppose localized peaks that occur in the vessel's magnetic field within the area covered by the main loop.

The current flow through the coils for overcoming the permanent magnetic component is determined and then kept constant between magnetic checks of the vessel. Where the vessel is not outfitted with separate degaussing coils for the permanent and induced components respectively, the current through the coils is varied as a function of latitude and heading of the vessel, the total current being the resultant of the summation of the current necessary to neutralize the permanent magnetic component and the varying current necessary for neutralizing the induced magnetic component. The currents for the permanent and induced magnetic components may be additive or subtractive depending upon field conditions.

The coils employed for degaussing are broadly classified as follows:

(1) An M or main coil which encircles the vessel in a horizontal plane usually at about the level of the water line and is designed to neutralize the vertical component of the combined permanent and induced magnetic components.

(2) An F or forecastle and a Q or quarterdeck coil, the former of which coils encircles approximately the forward one-third of the vessel and the latter of which coils encircles the after one third of the vessel, and which are usually located beneath the upper decks of the forward and after parts of the vessel. The F and Q coils neutralize the effect of the longitudinal component of the vessel's magnetic field. The F and Q coils may be separate or they may be serially connected. In addition, they may be subdivided so that the individual portions thereof are designed to nullify separately the portions of the induced and permanent magnetic components longitudinal of the vessel. In this description, where the F and Q coils are serially connected, they are referred to as FI and QI coils, respectively.

(3) An L or longitudinal coil which runs with its loops in vertical planes, the axis of the coil being parallel to the longitudinal axis of the vessel for nullifying the portion of the field longitudinal of the vessel. Though the L coil can more accurately simulate the longitudinal portion of the field of the vessel, it is not used much due to installation difficulties. Instead, the F—Q coils are generally used.

(4) An A or athwartship coil which has its loops in vertical planes running longitudinally of the vessel for neutralizing the portion of the induced magnetic component transverse to the axis of the vessel. The permanent magnetic component is usually neglected in A coil current settings because the portion thereof directed athwartship is small.

A degaussing system must also include compass compensating coils to overcome the effects of the degaussing coils on the magnetic compass. The compensation supplied by the compass coils must be proportional to the magnetic field produced by the corresponding degaussing coils so that the overall effect on the compass is zero.

An object of this invention is to provide a system for neutralizing a magnetic field.

A further object of this invention is to provide a plurality of degaussing coils for a vessel for neutralizing the vessel's field, the current flow through the degaussing coils varying as a function of the vessel's heading.

A further object of this invention is to provide means for varying the degaussing field strength of any body in proportion to the sine and cosine of the angle that the axis of the body makes with magnetic north.

A further object of this invention is to provide a degaussing system having a compass compensating arrangement.

Other objects and many of the attendant advantages of this invention will be readily appreciated as the same becomes better understood by reference to the following detailed description when considered in connection with the accompanying drawings wherein:

Fig. 6 and Fig. 7 are adjacent portions of a composite schematic diagram of a modification of this invention adapted for manual or automatic operation from a vessel's D. C. source.

Fig. 8 is a mechanical schematic diagram of a vessel illustrating the distribution of various degaussing coils about the vessel.

Figure 1:
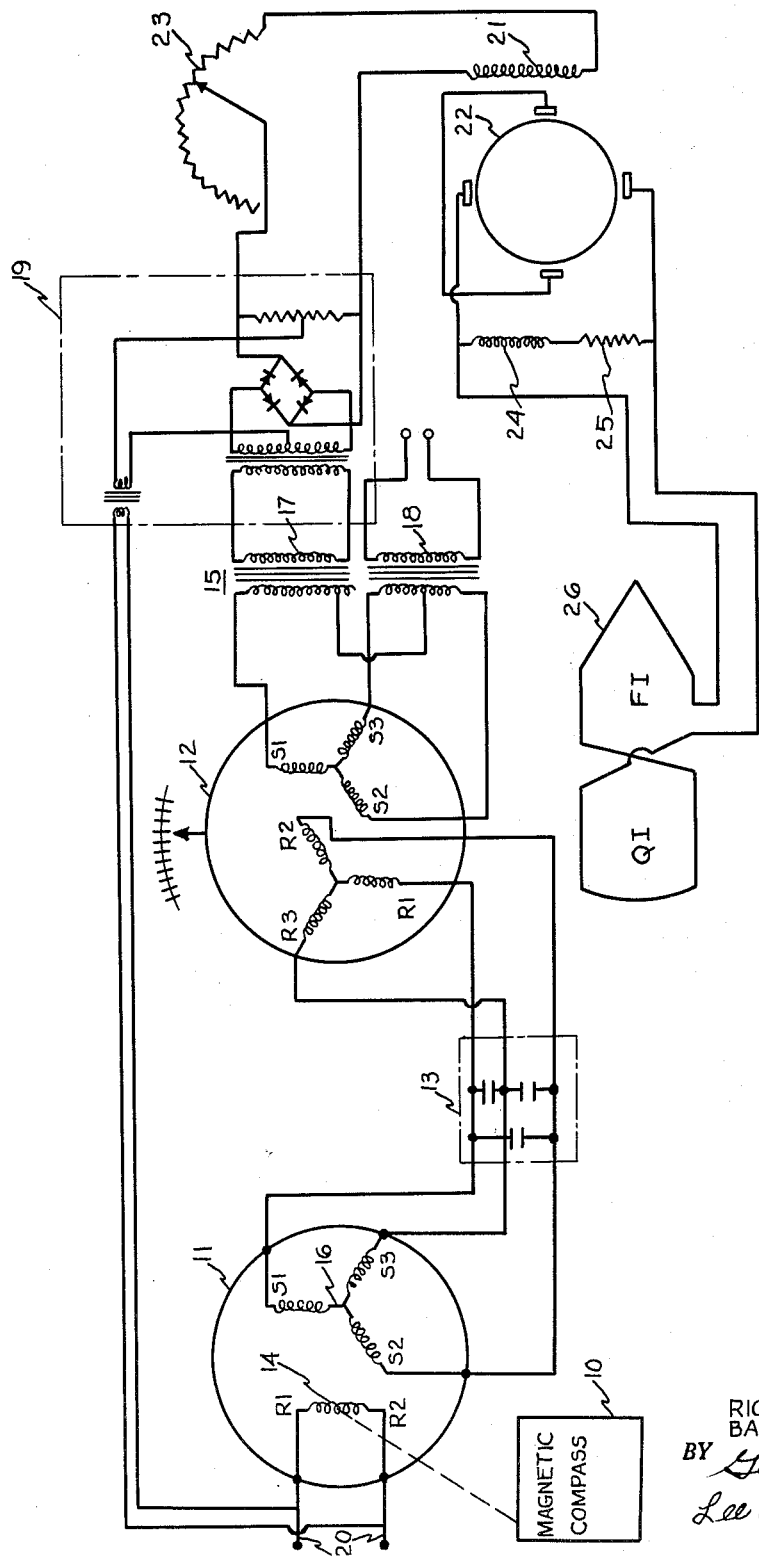
Fig. 1 is a schematic diagram of a preferred embodiment of this invention employing an amplidyne generator as a D. C. current source.

The apparatus shown in Fig. 1 is controlled by a vessel's magnetic compass 10. The compass is coupled to the rotor of synchro transmitter 11. The synchro transmitter 11, the synchro differential generator 12, and the synchro capacitor 13, are electrically connected to each other in a conventional manner. The rotor winding 14 is energized from A. C. source 20. The voltages induced in each of the Y-connected stator windings of the transmitter are a function of the angular position of the rotor. The stator windings of the transmitter 11 are connected to respective rotor windings of the bearing mounted differential generator 12. The purpose of the differential generator 12 is to provide a means of correction for deviations. The output of the differential generator is the resultant of the electrical and mechanical inputs. When the differential generator rotor is positioned at electrical zero, the generator output is equal to its input since the differential generator has a 1:1 ratio. By changing the relative positions of the stator and rotor windings the 1:1 ratio is changed. The synchro capacitor 13 serves to compensate for the lagging current drawn by the differential generator to reduce the IR drop in the transmitter windings and the connecting leads.

In order that the A or athwartship degaussing coil and the FI—QI degaussing coil be energized as a function of the sine and cosine, respectively, of the angle of the vessel's heading relative to magnetic north, a Scott-T transformer 15 is employed to control the energization of said coils. For simplicity, it may be considered that no deviation correction is necessary and since the differential generator has a 1:1 ratio, it further may be considered that the output of the transmitter stator 16 is fed directly to the Scott-T transformer 15. The latter comprises, in effect, two transformers 17 and 18. The output of transformer 17 is proportional to the cosine of the angle between the vessel's heading and magnetic north and the output of transformer 18 is proportional to the sine of said angle. The mathematics following is submitted in proof of the foregoing statements.

The vessel's heading is assumed to be at an angle $\theta$ relative to magnetic north. Since the rotor of the transmitter 11 follows the vessel's heading and assumes a corresponding position relative to its electrical zero position, the voltages induced in the stator windings are as follows:

$S1 = A \cos \theta$
$S2 = A \cos (\theta + 120)$
$S3 = A \cos (\theta + 240)$ where A is the maximum voltage induced in each of the stator coils for a given input voltage.

The voltage input to transformer 18 is equal to $S_2 - S_3$.

Figure 2:
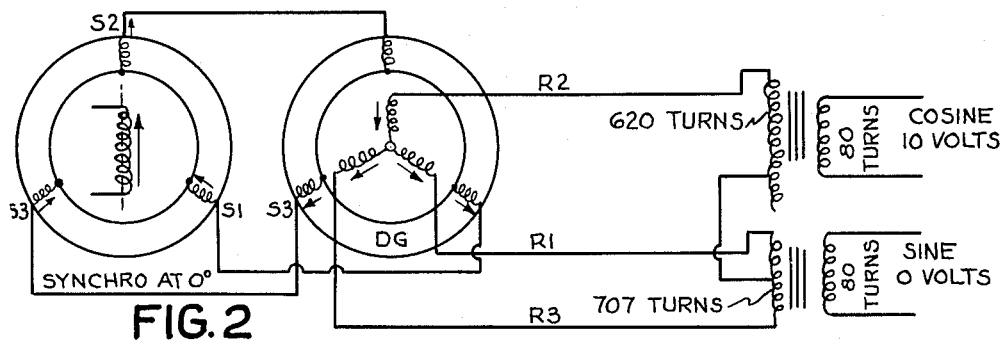
Figs. 2, 3, 4 and 5 illustrate in abbreviated form the apparatus of Fig. 1 under some of the conditions prevalent for different headings of a vessel.

$S_2 - S_3 = A \cos(\theta + 120) - A \cos(\theta + 240)$
$= A [\cos \theta \cos 120 - \sin \theta \sin 120 - \cos \theta \cos 240 + \sin \theta \sin 240]$
$= A [\cos \theta (\cos 120 - \cos 240) + \sin \theta (\sin 240 - \sin 120)] \cos 120 - \cos 240 = 0$
$= \sqrt{3} A \sin \theta = -1.73 A \sin \theta$ The voltage input to transformer 17 is calculated as follows:

$S1 + V17 + \frac{1}{2}(V18) - S_2 = 0$
$V17 = S_2 - S_1 - \frac{1}{2}(S_2 - S_3)$
$= \frac{1}{2}(S_3 + S_2) - S1$ $V17 = \frac{A}{2} [\cos(\theta + 120) + \cos(\theta + 240) - 2 \cos \theta]$ $= \frac{A}{2} [\cos \theta \cos 120 - \sin \theta \sin 120 + \cos \theta \cos 240 - \sin \theta \sin 240 - 2 \cos \theta]$ $= \frac{A}{2} [\cos \theta (\cos 120 + \cos 240 - 2)]$ $= \frac{A}{2} \cos \theta (-3) = -1.5A \cos \theta$ Figs. 2, 3, 4 and 5 illustrate the operation of the apparatus thus far described. The maximum voltage induced in each of the stator windings of the transmitter 11 is approximately 52 volts when the input to the rotor is 115 volts. As previously stated the differential generator has a 1:1 ratio. In Fig. 2 the synchro is at electrical zero corresponding to a heading toward magnetic north. As shown by the previous calculations, the maximum voltage applied to transformer 17 primary is equal to 1.5A which equals 78 volts. The turns ratio of 620/80 yields an output of 10 volts at 0 heading.

Figure 3:
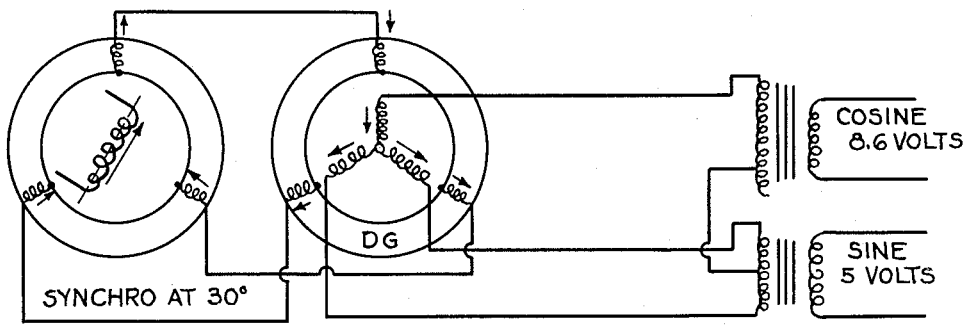
Figure 4:
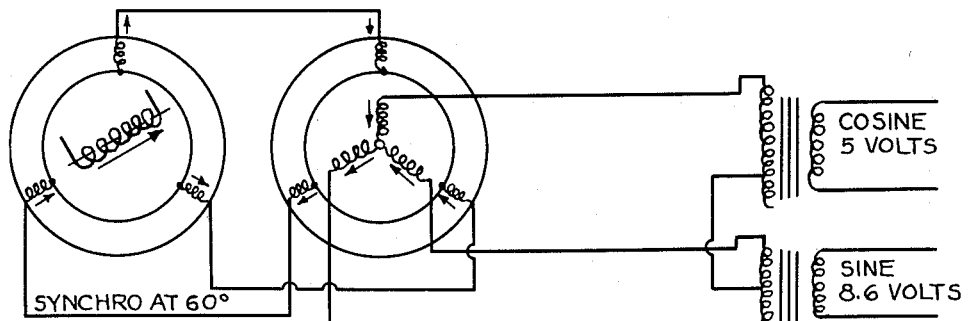
Figure 5:
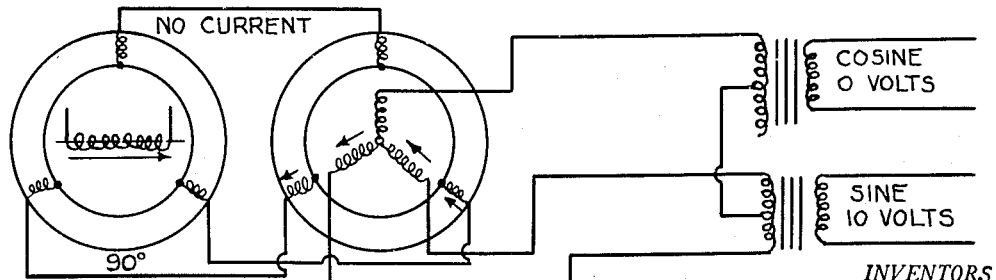

In Fig. 5 is illustrated the conditions corresponding to a 90° deviation. The maximum voltage supplied to the primary of transformer 18 is equal to 1.73A=90 volts. The turns ratio of 707/80, yields an output of 10 volts at 90° heading. Figs. 3 and 4 illustrate two intermediate conditions between 0° and 90° heading.

In Fig. 1, only the FI—QI coil connections are shown, it being understood that the A coil is connected in the same manner to the secondary of transformer 18 as the FI—QI coil is connected to the secondary of transformer 17. The output of transformer 17 may be fed into an amplifier-rectifier 19, the latter being supplied with a phase control the details of which are described in connection with the modification of Fig. 6. The phase control means is coupled to the input by means of leads 20. The output of the amplifier-rectifier 19 having the proper polarity as determined by the phase control is supplied to reference field 21 of amplidyne 22. A rheostat 23, in series with reference field 21, permits adjustment of the range of the amplidyne output. The voltage control field 24 in series with resistor 25 is designed so that the amplidyne output is linear. The amplidyne output is fed to FI—QI coil 26 for neutralizing the horizontal component of the induced magnetism longitudinal of the vessel. The A coil is similarly energized from the transformer 18 for neutralizing the horizontal component of the induced magnetization athwartship. The A and F—Q coils are energized in direct proportion to the sine and cosine, respectively, of the vessel's angular deviation from magnetic north.

Figs. 6 and 7 illustrate a modification of this invention arranged for use with a vessel's 115 volt D. C. supply. The synchro transmitter 27, the synchro capacitor 28, the synchro differential generator 29, and the Scott-T transformer 30 are arranged in the same manner as described in connection with Fig. 1. Since outputs 31 and 32 are fed into similar circuits, only the circuit cooperating with output 31 will be described, the circuit connected to output 32 having been omitted from the drawing for reasons of clarity. The FI—QI coil 33 which supplies the longitudinal degaussing component is in series with resistors 34 and 35, rheostat 36 and double pole-double throw switch 37, the combination being across the D. C. supply 38. The energization of the coil 33 is varied by means of the rheostat 36. The rheostat is power driven by a series motor 39. The resistors 34 and 35 have fixed values, their purpose being clearly set forth further on in the description.

The field of motor 39 is supplied by a split winding consisting of winding portions 40 and 41. The winding portions 40 and 41 are arranged to be energized separately and at different times and are used to produce opposite directions of rotation of the motor 39. The energization of one winding portion causes motor rotation in a direction so as to cut out resistance from the circuit of coil 33 and the energization of the other winding portion causes motor rotation in direction to cut in resistance. Therefore, control of the respective fields 40 and 41 controls the extent of energization of coil 33. The motor is further provided with a variable speed control for setting the R. P. M. of the motor and thereby setting the rate of change of energization of coil 33. The said setting may be resolved by a compromise between a need for rapid response on the one hand and minimum degree of overshooting or hunting on the other hand.

The apparatus disclosed provides for manual or automatic control of the rheostat motor 39. A three position selector switch 43 having contactors 44, 45, and 46 is provided to either open the motor circuit or condition the motor circuit for manual operation or for automatic operation.

When the selector switch is in the left-hand position, the circuit is conditioned for manual operation. Under this condition, one side of the motor is connected to the plus side of the D. C. supply 38 through a lead 47 and contactor 44. The single-pole double-throw switch 48 is provided for manually, selectively energizing motor windings 40 or 41. The stationary contacts 49 and 50 of switch 48 are directly connected to the respective windings 41 and 40. The contactor 51 of switch 48 is connected to the negative side of D. C. supply 38 through lead 52 and the contactor 45 of selector switch 43. When the contactor 51 of switch 48 is moved into engagement with contact 49, the circuit through motor 39 is completed via winding 41 to produce one direction of rotation. When the contactor 51 is moved into engagement with contact 50, the circuit through motor 39 is completed via winding 40 to produce rotation in the opposite direction. The manual switch may be conveniently located adjacent an ammeter 53, the latter being in the circuit of coil 33. With the aid of the ammeter 53, the coil 33 may be energized to any predetermined field strength. If it is necessary to reverse the field produced by coil 33, the motor is energized to move the rheostat contactor 54, toward the high resistance end of the rheostat. When the contactor 54 reaches the end of its travel, the circuit of coil 33 is opened, and the double-pole double-throw switch is automatically actuated to reverse the direction of current flow through coil 33. The direction of rotation of motor 39 is then reversed by throwing contactor 51 in the opposite direction and current through 33 is brought back to its original value. The current reversal may be accomplished without bringing the current down to zero, but the high current flow would damage the reversing switch. Limit switches, not shown, may be included at each end of the path of the rheostat member to prevent damage.

Generally, it is desirable to automatically vary the energization of coil 33 in direct proportion to the cosine of the angle of the vessel's heading relative to magnetic north.

To condition the circuit for automatic operation, the contactors of selector switch 43 are moved to the right hand position, the contactors being shown in this position on the drawing. In this position the manual switch 48 is out of the motor control circuit and electromagnetic switch 55 is put into the motor control circuit. As in the case of manual operation, one side of motor 39 is connected to the plus side of D. C. supply 38. The switch 55 has two electromagnets 56 and 57 for actuating contactor units 58 and 59, respectively. When the electromagnet 56 is energized, motor winding 40 is connected to the negative side of supply 38 and when the electromagnet 57 is energized, the motor winding 41 is connected to the negative side of supply 38. The switch 55 accomplishes the same thing as switch 48 but is arranged to do it automatically. The upper contacts of switch 55 function to complete a circuit from D. C. supply 38 to a polarity indicator 60. Additional indicators may be included throughout various parts of the system.

The electromagnets 56 and 57 are selectively energized through a voltage comparison relay 61. One end of each electromagnet is connected to the plus side of the D. C. supply. The relay 61 controls the connection of the opposite end of either of the electromagnets to the negative side of the D. C. supply. The relay 61 may be composed of either electronic or electromagnetic components. It serves to close the circuit to electromagnet 56 or 57 as a function of the ratio of its two input voltages. The relay 61 functions in such a manner that if the ratio of the two voltages is greater than a predetermined value, one electromagnet is energized; if smaller than said predetermined value the other electromagnet is energized. An example of such a relay may be one having two coils energized by said two respective input voltages and acting on one armature. The relay could also be electronic. An example of a suitable electronic relay is disclosed in page 427, section 1220 of "Electronic Instruments" which is volume 21 of the Massachusetts Institute of Technology Radiation Laboratory Series published by McGraw-Hill of New York. The details of the relay 61 constitute no part of this invention. Any commercial voltage comparison relay that has the proper accuracy and voltage range will suffice.

The voltages to be compared are (1) proportional to a trigonometric function of the vessel's heading, and (2) proportional to the energization of the degaussing coil 33, respectively.

The voltage that is proportional to a trigonometric function of the vessel's heading, as described in connection with Fig. 1, is obtained at output 31 and is proportional to the cosine of the angle of the vessel's heading. The voltage that is proportional to the energization of coil 33 is obtained from taps across resistor 35 and is always at a fixed ratio to the field produced by coil 33. When the vessel's heading changes the ratio between the voltages applied to relay 61 is changed. The relay 61 closes the proper circuit to motor 39 to be energized whereby the voltage across resistor 35 is changed in the same direction as the voltage from output 31. When the predetermined ratio between the two input voltages to relay 61 is restored the motor circuit is opened.

The voltage obtained from the taps of resistor 35 is directly proportional to the energization of coil 33, and of polarity corresponding to the energization of coil 33. However, output 31 supplies an A. C. voltage having the same frequency as input 20 and varying only in magnitude. Since the cosine of an angle between 90–180–270 degrees is negative whereas the cosine of an angle between 270–0–90 is positive it is necessary to provide means for changing the output from 31 to D. C. of proper magnitude and polarity.

The circuit provided for this purpose includes a transformer 62, a rectifier bridge 63, and a reference voltage. The reference voltage which is derived from the input 20 that supplies the rotor winding of the synchro transmitter is applied between the center tap of the secondary of transformer 62 and the center tap of resistor 65, a rheostat 66 being provided to adjustably control the range of output current. The voltage across each half of resistor 65 due to the reference voltage 64 is equal and opposite, thereby cancelling each other. The bridge 63 is so arranged that when the direction of the induced voltage in the secondary of transformer 62 is directed upward, only the upper half of the transformer secondary supplies an output to relay 61. When the direction of the induced voltage is directed downward the converse is true. If the upper part of the transformer secondary is going positive when the center tap of resistor 65 is going negative, a D. C. output will be produced such that the upper half of resistor 65 is positive relative to the lower half. If the upper part of the transformer secondary is going positive when the center tap of the resistor is going positive, a D. C. output will be produced such that the upper half of resistor 65 is negative relative to the lower half. Therefore the phase relationship between reference voltage 64 and the output voltage 31 changes 180 degrees when the vessel's heading changes from the 90–180–270 degree zone to the 270–0–90 degree zone. The polarity of the D. C. input to relay 61 is accordingly reversed. The direction of current flow through coil 33 is reversed when the vessel's heading changes as above. As the vessel changes zones the rheostat element 54 has moved to the zero current position on the rheostat and actuates the double-pole double-throw switch. The polarities of the two inputs to relay 61 change at the same time.

In regard to automatic operation of the double-pole double-throw switch 37, proper operation of the system requires the provision of means precluding operation of the double-pole double-throw switch at the improper time. As the vessel changes from the 90–180–270 degree zone to the 270–0–90 degree zone, it is necessary to reverse the polarity of the current through the FI—QI coil. However, if the double-pole double-throw switch is operated precisely at the 90 degree or 270 degree heading of the vessel, improper operation could result if the vessel did not head into the zone other than the one it was in but instead reversed its heading back into the same zone. To avoid this contingency, several alternatives may be implemented. For one, the double-pole double-throw switch need not operate precisely at 90 degree or 270 degree heading. Instead, as the vessel is heading from either zone into the other the switch may be operated after the vessel's heading has changed into the other zone about one degree. To accomplish this, the rheostat motor 39 is permitted to overtravel, that is, not reverse direction until the vessel's heading has progressed into the other zone about one degree. At that time the double-pole double-throw switch 37 would be actuated. To provide for this condition of operation, the relay may be suitably modified and/or the linearity of the rheostat at the high resistance end may be modified. Then too, as an alternate, it may be desirable under some conditions of use to provide an electrically operable interlock between the source supplying the D. C. voltage corresponding to heading and the double-pole double-throw switch so that the said switch cannot be operated except when the polarity of said voltage changes. Another alternative setup is to arrange the double-pole double-throw switch so that it is operated directly under the control of the polarity of the voltage corresponding to the vessel's heading. The particular method adopted is dependent upon conditions of use.

The resistor 34 in series circuit with coil 33 provides a tap off voltage supply proportional to the energization of coil 33, said supply being for the purpose of energizing the compass compensating coil (not shown) corresponding to coil 33 in direct proportion to the energization of degaussing coil 33. The compass compensating coil nullifies the effect of the degaussing coil at the binnacle.

In operation the apparatus disclosed controls the output of the appropriate degaussing coils causing their output to vary as the vessel's heading changes. The outputs at 31 and 32 are of the same frequency as the input at 20. The synchro arrangement 27, 28, and 29 operates from the ship's compass, and Scott-T transformer 30 vary the outputs 31 and 32 in direct proportion to the cosine and sine of the vessel's angular deviation from magnetic north. Each of the outputs 31 and 32 controls a degaussing coil. The cosine output from 31 and the energization of coil 33 are constantly monitored by relay 61. The said relay 61 controls the motor 39 to cut in or cut out resistance from the circuit of coil 33 as the heading changes. The double-pole double-throw switch 37 is provided to reverse the field produced by coil 33 if the vessel's heading deviates more than 90 degrees or 270 degrees either way from magnetic north.

This control system may be coupled with suitable apparatus for varying the amount of magnetic output of the degaussing coils as the vessel proceeds from one range of latitude to another range of latitude. A plurality of range setting resistors adapted to be placed in series with the supply to coil 33 can be used to vary the amount of field strength produced by the degaussing coils.

Obviously many modifications and variations of the present invention are possible in the light of the above teachings. It is therefore to be understood that within the scope of the appended claims the invention may be practiced otherwise than as specifically described.

I claim:

1. Apparatus for generating a pair of alternating current voltages that vary in magnitude in direct proportion to the sine and cosine of an angular deviation comprising, a synchro transmitter having a rotor winding supplied by an A. C. source, said synchro transmitter having a Y-connected stator with three output terminals, a synchro differential generator in circuit with said output to allow for introduction of deviation corrections and likewise having three output terminals, a Scott-T transformer, the primaries of said transformer being connected across the latter terminals and the secondaries of said transformer providing the alternating current voltages, the angular deviation being measured from the electrical zero position of the transmitter rotor as said rotor assumes different angular positions.

2. Apparatus adapted to generate voltages proportional to the sine and cosine, respectively, of the angle between a ship's heading and magnetic north comprising, a synchro transmitter adapted to be mechanically coupled to a ship's compass, a synchro differential generator in the output circuit of said transmitter for introducing variation adjustment, a Scott-T transformer connected across the output of said differential generator and providing the voltages.

3. A degaussing system for a vessel comprising current carrying coils adapted to be located about the vessel for neutralizing the magnetic field of the vessel, one of said coils adapted to produce a magnetic field athwartship and a second of said coils adapted to produce a magnetic field longitudinal of the vessel, the resultant of the latter two magnetic fields adapted to nullify the horizontal component of the vessel's induced magnetic field, means for varying the energization of said two coils as the vessel's heading changes so that the resultant of the two produced fields continuously nullifies the horizontal component of the vessel's induced magentic field, said means comprising a synchro transmitter whose shaft is adapted to be coupled to the vessel's compass, a Scott-T transformer connected across the output of said transmitter, said Scott-T transformer producing two output voltages which are proportional to the sine and cosine respectively of an angular deviation of the shaft of the synchro transmitter, a rheostat in circuit with each coil, a motor means for operating each said rheostat, relay means arranged to cause energization of the motor means, said relay means being responsive to the relationship between the extent of energization of the degaussing coils and the Scott-T transformer outputs.

4. A system for use in degaussing a vessel comprising a degaussing coil arranged to be energized from a direct current source, a rheostat in series with said degaussing coil, a double-pole double-throw switch arranged to be operated by the movable member of the rheostat for reversing the direction of current flow in said degaussing coil, motor means for moving said movable member, said motor means having two field windings, one field when energized producing clockwise rotation and the other field when energized producing counterclockwise rotation of said motor, switch means for completing an energization circuit through either of said fields, a resistor in series with said degaussing coil for producing a voltage proportional to the degree of energization of the coil, additional means for producing a voltage proportional to a trigonometric function of the angle of the vessel's heading relative to magnetic north, relay means operable under the combined control of the two last mentioned voltages whereby when the ratio of the two voltages deviates from a predetermined value, said relay causes said switch means to close an energization circuit to the appropriate motor field winding to vary the energization of said degaussing coil, the voltage supplied by the resistor in series with said degaussing coil changing proportional to the change in the energization of the degaussing coil whereby the motor field is deenergized when the predetermined ratio between the two voltages put into the relay is restored.

5. Apparatus for adjusting the magnetic output of a ship's degaussing system having an A coil and an FI—QI coil in accordance with the ship's heading, comprising a pair of generators for supplying the respective coils, each generator being so adjusted that its output varies linearly with the excitation of its field, a Scott-T transformer, the secondaries of which are arranged to supply the respective fields, a synchro transmitter having Y-connected output windings connected to the primaries of said Scott-T transformer whereby the generators are adapted to vary the A coil excitation as a function of the sine and the FI—QI coil as a function of the cosine of angular deviation of the transmitter rotor, the said rotor of the synchro transmitter being arranged to change its angular orientation by the same degree that the ship's heading changes.

6. Apparatus according to claim 5 and further comprising an amplifier for each generator, the amplifier being provided with phase control, each amplifier being connected between one secondary and one generator field whereby the field of each generator has the proper direction.

7. Apparatus according to claim 6 and further comprising a synchro differential generator connected in the output circuit of said synchro transmitter between the transmitter and Scott-T transformer for permitting variation adjustments.

8. An automatic degaussing system for a ship comprising, an A coil for producing a horizontal field athwartship, an FI—QI coil for producing a horizontal field longitudinal of the ship, the resultant of said two produced fields being of such magnitude and direction as to nullify the horizontal component induced in the ship by the earth's field, first and second direct current sources coupled to said A and FI—QI coils respectively, and including first and second means respectively, adapted for varying the outputs thereof, a synchro transmitter whose rotor is coupled to the ship's compass, a synchro differential generator coupled to the stator windings of said transmitter for variation adjustment, a Scott-T transformer having three input terminals coupled to said differential generator and having two pairs of output terminals providing two voltages, one proportional to the cosine of the angle of ship's heading with respect to magnetic north and the other proportional to the sine of the angle between the ship's heading and magnetic north, and additional means coupling said first and second means to said two pairs of output terminals respectively, of said Scott-T transformer whereby the voltages from said two pairs of output terminals control the inputs to their respective field producing coils.

References Cited in the file of this patent

UNITED STATES PATENTS

| | | |
|---|---|---|
| 1,224,255 | Alden | May 1, 1917 |
| 2,412,617 | Jenkins | Dec. 17, 1946 |
| 2,519,395 | Perlow et al. | Aug. 22, 1950 |
| 2,541,093 | Page | Feb. 13, 1951 |
| 2,571,106 | Brannin | Oct. 16, 1951 |